United States Patent [19]
Kazirskis et al.

[11] Patent Number: 5,910,258
[45] Date of Patent: Jun. 8, 1999

[54] WELD HEAD ASSEMBLY

[75] Inventors: Benedict Kazirskis, Barto, Pa.; Lawrence M. Grycko, Lockport, Ill.

[73] Assignee: General Electric Company, Schenectady, N.Y.

[21] Appl. No.: 08/621,392

[22] Filed: Mar. 25, 1996

[51] Int. Cl.⁶ .................................................. B23K 9/12
[52] U.S. Cl. .................................... 219/60 R; 219/125.11
[58] Field of Search ............................ 219/125.11, 60 R, 219/60 A, 61

[56] References Cited

U.S. PATENT DOCUMENTS

| | | | |
|---|---|---|---|
| 2,985,746 | 5/1961 | Harmes | 219/125.11 |
| 3,042,787 | 7/1962 | Kotecki | 219/60 A |
| 4,144,992 | 3/1979 | Omae et al. | 219/125.11 |
| 4,331,278 | 5/1982 | Sherer et al. | 219/125.11 |
| 4,726,300 | 2/1988 | Kazlauskas | 219/60 A |
| 5,099,098 | 3/1992 | Burgoon | 219/125.11 |
| 5,126,523 | 6/1992 | Rinaldi | 219/125.11 |
| 5,534,676 | 7/1996 | Rinaldi et al. | 219/125.11 |

*Primary Examiner*—Clifford C. Shaw
*Attorney, Agent, or Firm*—Armstrong Teasdale LLP

[57] ABSTRACT

A weld head assembly which, in one embodiment, includes a mounting ring subassembly and a faceplate subassembly is described. The mounting ring subassembly includes a mounting ring configured to be mounted to one of the pipes to be welded. At least one motor is mounted to the mounting ring and the motor includes an output shaft having a rotatable spur gear mounted thereto. A plurality of bevel rollers are mounted, at spaced locations, to the mounting ring and each of the rollers is mounted along a same radial path. The faceplate subassembly is secured to the mounting ring subassembly and includes a faceplate ring, a bevel ring and a spur gear mounted to the faceplate ring. Wire spool holders, wire feeders, a welding torch, and cameras are secured to the rotatable faceplate ring. The bevel ring is located to rotatably interface with the bevel rollers of the mounting ring subassembly and the spur gear is located to mesh with the rotatable spur gear of the mounting ring motor so that the faceplate subassembly rotates with the motor spur gear.

18 Claims, 8 Drawing Sheets

WELD HEAD ASSEMBLY

FIELD OF THE INVENTION

This invention relates generally to apparatus for performing in-situ weld operations in a nuclear reactor and, more particularly, to automated welding assemblies particularly suitable for use in welding pipes of nuclear reactor piping systems.

BACKGROUND OF THE INVENTION

Numerous piping systems typically are included in nuclear reactors. Such piping systems are utilized, for example, to deliver feedwater to the reactor pressure vessel (RPV) and to deliver steam from the RPV to a power generator. Numerous pipes typically extend throughout the reactor and sometimes are located in crowded spaces with many other pipes and other reactor equipment.

Over the life of the reactor, reactor piping systems may be modified, upgraded, repaired or replaced. When performing such tasks, it often is necessary to weld, or join, the pipes of the particular piping system. It is desirable, of course, that such welds be of high quality to prevent the leakage of reactor water. It also is desirable to use automated welding equipment to facilitate repeatability of high quality welds and also to decrease operator exposure to radiation.

Known and commercially available automated welding equipment generally can be used to perform a wide range of pipe joining applications. In-situ equipment clearance requirements in nuclear reactor welding applications, however, are more limited than in many other pipe joining applications. As a result, to use the known automated welding equipment in a nuclear reactor application, peripheral system interferences (e.g., other reactor components) often must be removed and then, after completing the welding operation, reinstalled into the original configuration. Of course, removing reactor components so that a weld operation can be performed and then reinstalling the components in to the original configuration increases the time required to complete the operation. Increasing the time required to perform the weld operation typically results in increased reactor shut-down time and increased operator radiation exposure.

In addition, in some circumstance, the reactor component configuration simply cannot accommodate the welding equipment. Under such circumstances, a worker typically manually performs the weld operation. Of course, requiring a worker to manually perform the weld operation increases the potential for reduced quality and also increases the worker radiation exposure, which is undesirable.

It would be desirable to provide an automated weld assembly particularly suitable for use in nuclear reactor applications having minimal axial and radial clearances and which is easy to install and controllable for forming high quality welds. It also would be desirable to provide such a weld assembly capable of being securely mounted in very restricted spaces, or envelopes, and which is easily configured for many different set-up circumstances.

SUMMARY OF THE INVENTION

These and other objects are attained by a weld head assembly which includes a mounting ring subassembly and a faceplate subassembly. The mounting ring subassembly, in one embodiment, includes a mounting ring configured to be mounted to one of the pipes to be welded. At least one motor is mounted to the mounting ring and the motor includes an output shaft having a rotatable spur gear secured at its end. A plurality of bevel rollers are mounted at spaced locations to the mounting ring and each of the rollers is mounted along a same radial path.

The faceplate subassembly, in one embodiment, is rotatably secured to the mounting ring subassembly and includes a faceplate ring. A bevel ring and a spur gear are mounted to the faceplate ring. The bevel ring is located to rotatably interface with the bevel rollers of the mounting ring subassembly and the spur gear is located to mesh with the rotatable spur gear of the mounting ring drive motor so that the faceplate subassembly rotates under the control of the drive motor. Wire spool holders, wire feeders, a welding torch, and cameras are secured to the rotatable faceplate ring.

In operation, and prior to making a weld, the mounting ring is mounted to a pipe adjacent a location to be welded. The faceplate subassembly is then rotatable secured to the mounting ring subassembly and the drive motor is secured to the mounting ring so that the mounting ring drive motor spur gear meshes with the faceplate spur gear. The welding torch is then operated as the mounting ring drive motor causes the faceplate subassembly, including the welding torch, to rotate relative to the pipe. After making one or several complete revolutions or passes, depending on the thickness of the pipe to be joined, the weld is formed and the faceplate and mounting ring subassemblies can be removed from the pipe.

The above described automated weld head assembly is particularly suitable for use in nuclear reactor applications having minimal axial and radial clearances and is easy to install and controllable for forming high quality welds. The assembly also can be securely mounted in very restricted envelopes and is easily configured for many different set-up circumstances.

DETAILED DESCRIPTION OF THE DRAWINGS

Figure 1:
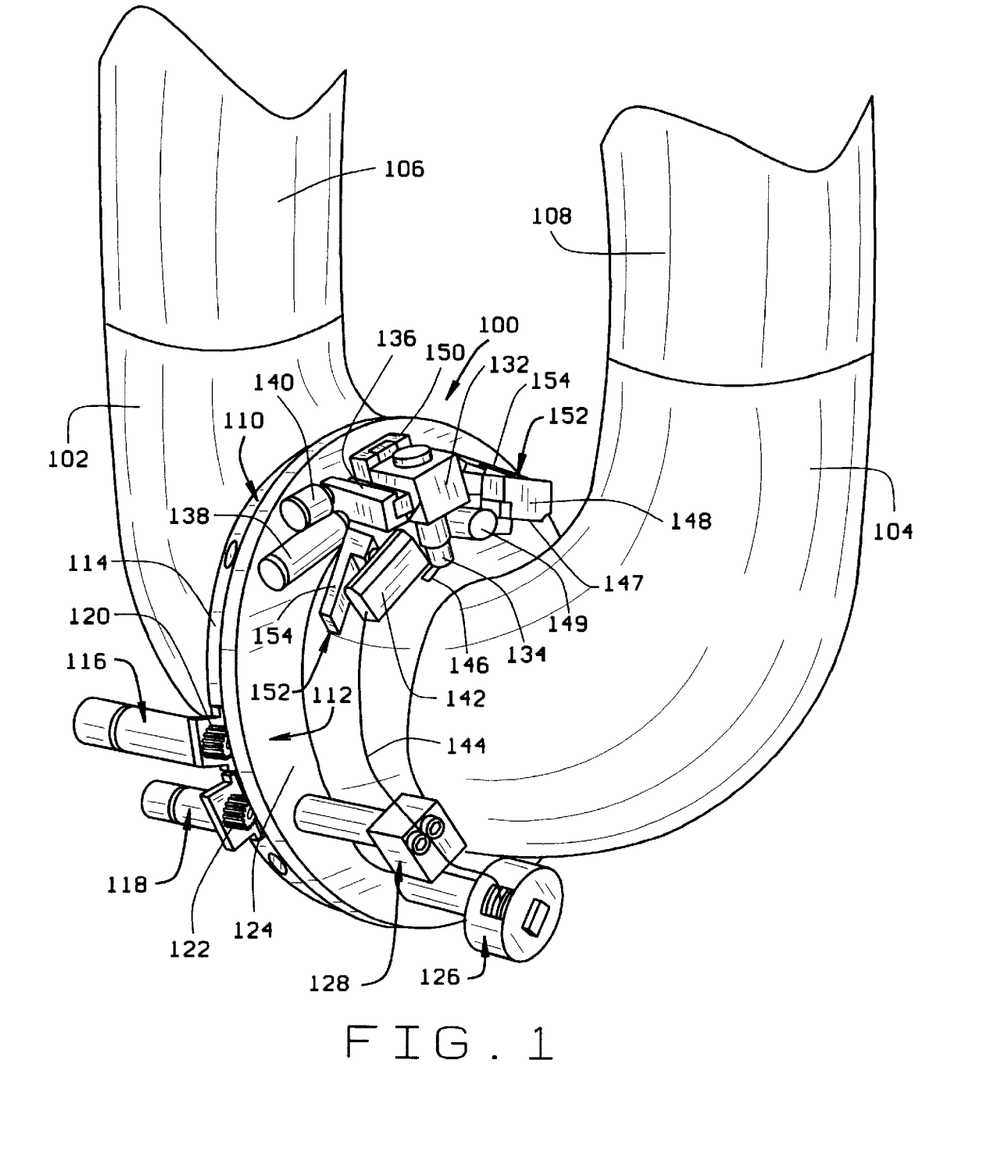
FIG. 1 is a perspective view of segments of pipes having a welding assembly in accordance with one embodiment of the present invention mounted thereto.

FIG. 1 is a perspective view of a welding head assembly 100 in accordance with one embodiment of the present invention. Assembly 100 is shown secured to an elbow pipe 102 which is to be welded to another elbow pipe 104. Elbow pipes 102 and 104 are welded to pipes 106 and 108, respectively. Pipes 102, 104, 106 and 108 have a substantially circular cross sectional shape. The specific configuration of pipes 102, 104, 106 and 108 is provided merely by way of illustration to show just one configuration in which assembly 100 is particularly beneficial. Assembly 100 could, of course, be used in many alternative pipe configurations. Also, although assembly 100 is sometimes described herein in the context of a nuclear reactor welding application, it is contemplated and possible to use assembly 100 in many other different welding applications other than just nuclear reactor applications.

Referring now specifically to FIG. 1, weld head assembly 100 includes a mounting ring subassembly 110 and a faceplate subassembly 112. Mounting ring subassembly 110 includes a mounting ring 114 shown in FIG. 1 as being mounted to pipe 102. A drive motor 116 and a slave motor 118 are mounted to mounting ring 114, and each motor 116 and 118 includes an output shaft (not shown in FIG. 1) having a rotatable spur gear 120 and 122, respectively, secured thereto, as described hereinafter in more detail.

Faceplate subassembly 112 is secured to mounting ring subassembly 110 and includes a faceplate ring 124 rotatable secured to mounting ring 114 as described hereinafter in more detail. A wire spool holder 126 and a first wire feeder 128 also are mounted to faceplate ring 124. A torch assembly 130 is mounted to faceplate ring 124 and torch assembly 130 includes a torch body 132 and a torch cup 134 extending therefrom. Torch body 132 is secured to an oscillator slide 136 controlled by an oscillator motor 138. An oscillator feedback potentiometer 140 also is secured to oscillator slide 136 to provide position information regarding the position of slide 136. Oscillator motor 138 controls the forward and backward positioning of torch body 132.

A wire aiming assembly 142 is coupled to torch assembly 130 and receives wire fed from first wire feeder 128. Wire 144 extends from wire aiming assembly 142 to a wire nozzle 146. A side/side motor 147 and an up/down motor 148 are provided to control the side-to-side and up and down position of wire nozzle 146. Motor 149, referred to herein as an automatic voltage control (AVC) motor, is coupled to slide 150. Cameras 152 including camera housings 154, are secured to faceplate ring 112 and are positioned to view the location of the weld to be formed.

Generally, and prior to making a weld, mounting ring 114 is mounted to pipe 102 adjacent a location to be welded. Faceplate subassembly 112 is then rotatable secured to mounting ring 114. Motors 116 and 118 of mounting ring subassembly 110 are then secured to mounting ring 114.

Welding torch assembly 130 is then operated as mounting ring drive motor 116 causes faceplate subassembly 112, including welding torch assembly 130, to rotate relative to pipes 102 and 104. After making one or several passes, the weld is formed and faceplate and mounting ring subassemblies 110 and 112 can be removed from pipe 102. If more than one pass or revolution is required, faceplate subassembly 112 is rotated in one direction, e.g., clockwise, for one complete revolution for example. Faceplate subassembly 112 is then rotated in a second direction, e.g., counter-clockwise, for one complete revolution. This process is repeated until the desired number of passes have been made.

Figure 2:
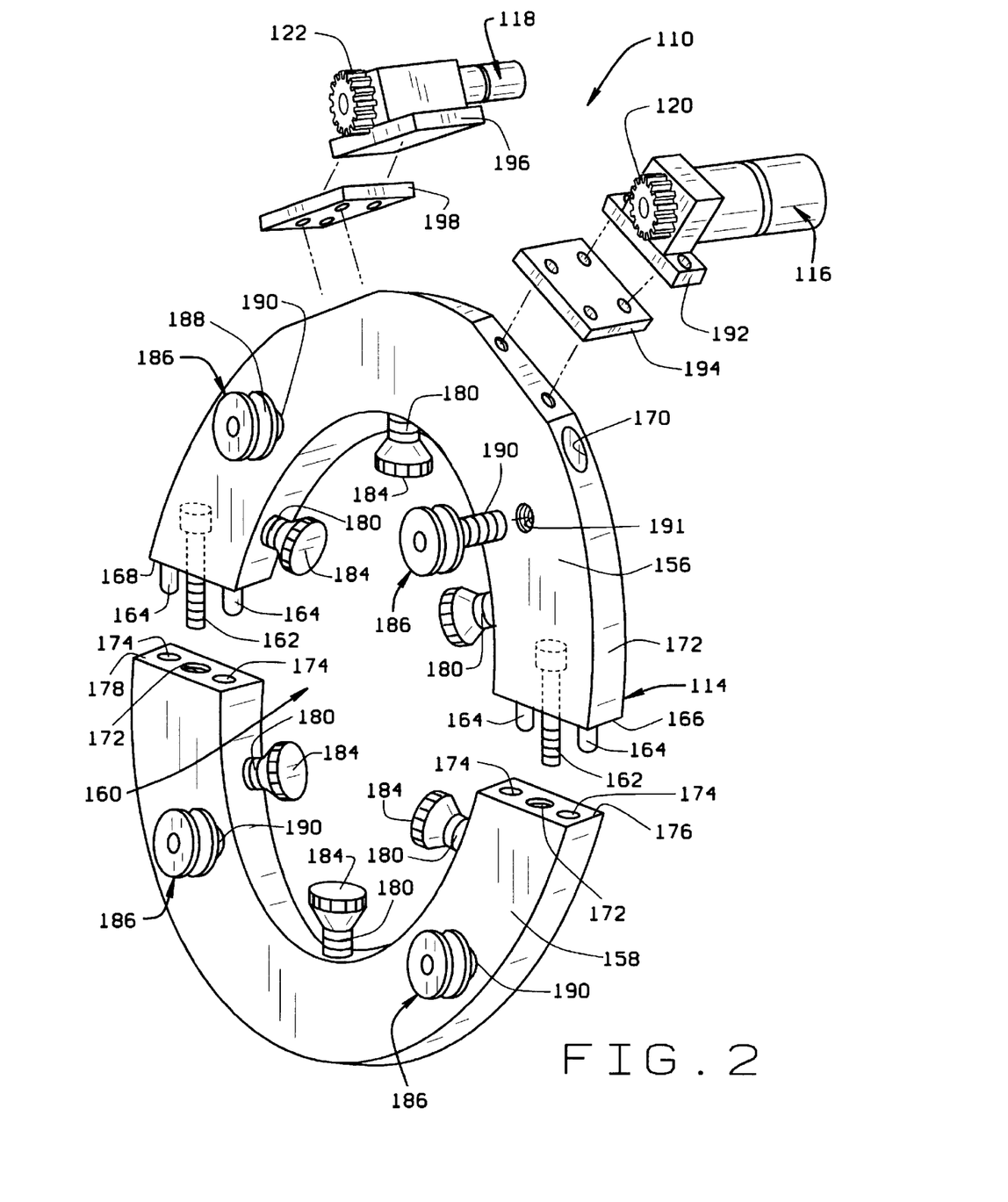
FIG. 2 is an exploded perspective view of the mounting ring subassembly forming part of the welding assembly shown in FIG. 1.

FIG. 2 is an exploded perspective view of mounting ring subassembly 110 shown in FIG. 1. Mounting ring subassembly 110 includes split mounting ring 114 including an upper ring 156 and a lower ring 158. When engaged, rings 156 and 158 define an inner, circular shaped opening 160. Upper ring 156 includes threaded bolts 162 and alignment dowel pins 164 extending from respective ends 166 and 168. Tool openings 170 extend from outer surface 172 of ring 156 to bolts 162. Lower ring 158 includes bolt openings 172 and dowel pin openings 174 at respective ends 176 and 178. Split rings 156 and 158 are securely engaged by aligning split rings 156 and 158 so that dowel pins 164 extend into openings 174 and threaded bolts 162 are then tightened into bolt openings 172 using an alien wrench (not shown) which extends through openings 170 into engagement with bolts 162.

A plurality of alignment screws 180 extend radially inward from an inner radial surface 182 of split rings 156 and 158. Each alignment screw 180 has a swivel pad 184 at its end. Swivel pads 184, in operation, are tightly pressed against the outer surface of a pipe to rigidly and securely hold mounting ring subassembly 110 in position on the pipe. Mounting ring subassembly 110 also includes a plurality of bevel rollers 186 mounted to split rings 156 and 158 at spaced locations. Rollers 186 include a rotatable roller member 188 and a threaded shaft 190. Shafts 190 are threadedly inserted into openings 191 in rings 156 and 158 so that roller members 188 are positioned along a same radial path. In FIG. 2, four bevel rollers 186 are shown as being mounted at spaced locations on mounting rings 156 and 158. As described hereinafter in more detail, bevel rollers 186 are configured to be rotatably secured to faceplate subassembly 112 (FIG. 1).

As shown in FIG. 2, motors 116 and 118 also are mounted to upper mounting ring 156. Motor 116 sometimes is referred to herein as drive motor 116 and motor 118 sometimes is referred to herein as slave motor 118. Drive motor 116 includes a mounting flange 192 and spur gear 120. An offset plate 194 is secured to ring 156 and flange 192 is secured to plate 194. Slave motor 118 includes a mounting flange 196 and spur gear 122. An offset plate 198 is secured to ring 156 and flange 196 is secured to plate 198.

Figure 3A:
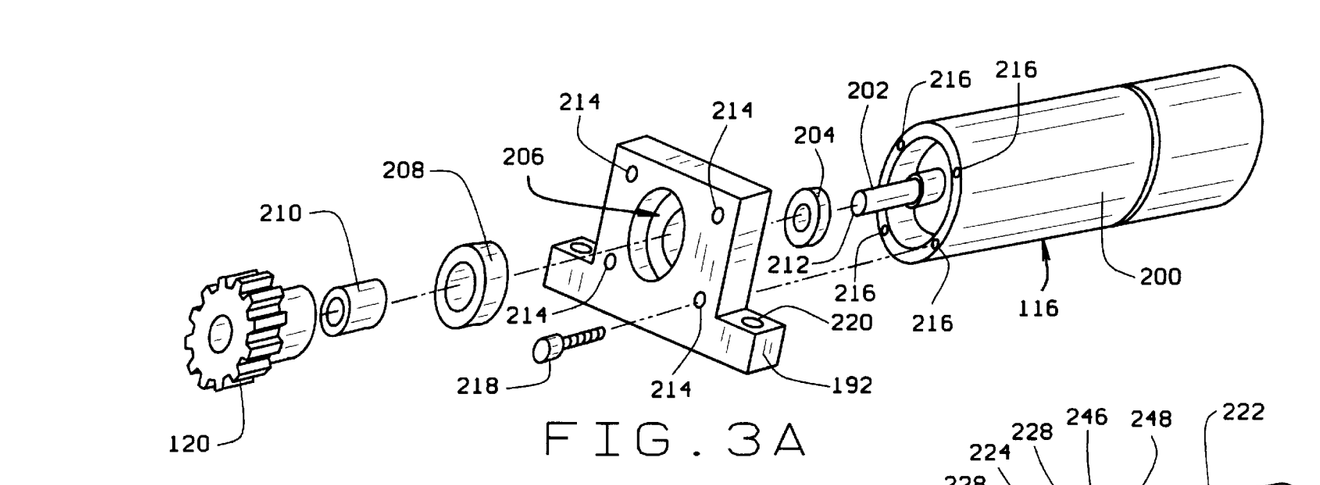
FIGS. 3A and 3B are exploded perspective views of the drive motor and slave motor of the mounting ring subassembly shown in FIG. 2.
Figure 3B:
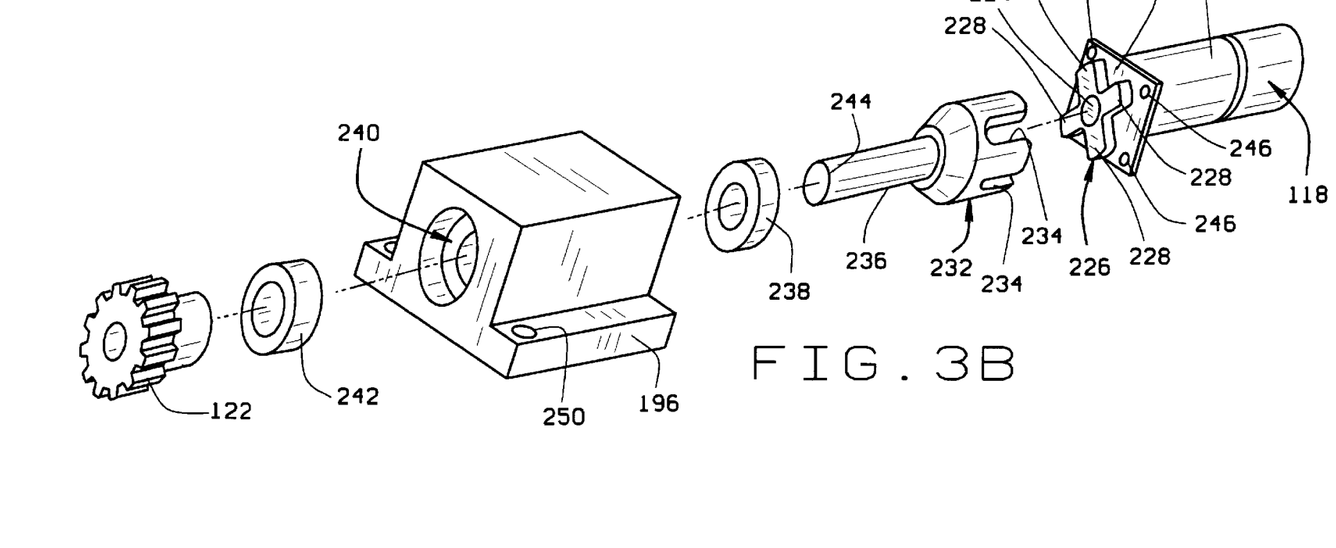

FIGS. 3A and 3B are exploded perspective views of drive motor 116 and slave motor 118 shown in FIG. 2. With respect to FIG. 3A, drive motor 116 includes a drive motor housing 200 having an output shaft 202 extending therefrom. An inner support bearing 204 seats in flange 192 in axial alignment with opening 206 in drive motor mounting flange 192. An outer support bearing 208 also seats in flange 192 in axial alignment with opening 206 and opposite inner support bearing 204. Output shaft 202 extends through inner support bearing 204, opening 206, and outer support bearing 208. A shaft sleeve 210 is sized to have output shaft 202 extend therethrough and abuts against outer support bearing 208. Spur gear 120 is engaged with end 212 of shaft 202. Flange 192 is secured to motor housing 200 by aligning openings 214 in flange 192 with openings 216 in housing 200. Threaded bolts 218 extend through aligned openings 214 and 216 and threadedly engage flange 192 to housing 200. Openings 220 in flange 192 align with openings in plate 194 (FIG. 2) and threaded bolts (not shown) engage flange 192 to plate 194 through the aligned openings.

With respect to FIG. 3B, slave motor 118 includes a slave motor housing 222 having a rotatable shaft drive 224 extending therefrom. Rotatable shaft drive 224 includes a drive member 226 having four fingers 228. An output shaft 230 engages to rotating shaft drive 224. Specifically, output shaft 230 includes a receptacle 232 having four openings 234 for engaging to fingers 228. An elongate, substantially cylindrical member 236 extends from receptacle 232. An inner support bearing 238 seats in flange 196 in axial alignment with opening 240. An outer support bearing 242 also seats in flange 196 in axial alignment with opening 240 and opposite inner support bearing 238. Output shaft 230 extends trough inner support bearing 238, opening 240, and outer support bearing 242. Spur gear 122 is engaged with end 244 of shaft 230. Flange 196 is secured to motor housing by aligning openings (not shown) in flange 196 with openings 246 In a plate member 248 secured to housing 222. Threaded bolts (not shown) extend through the aligned openings and threadedly engage flange 196 to housing 222. Openings 250 in flange 196 align with openings in plate 198 (FIG. 2) and threaded bolts (not shown) engage flange 196 to plate 198 through the aligned openings.

Figure 4:
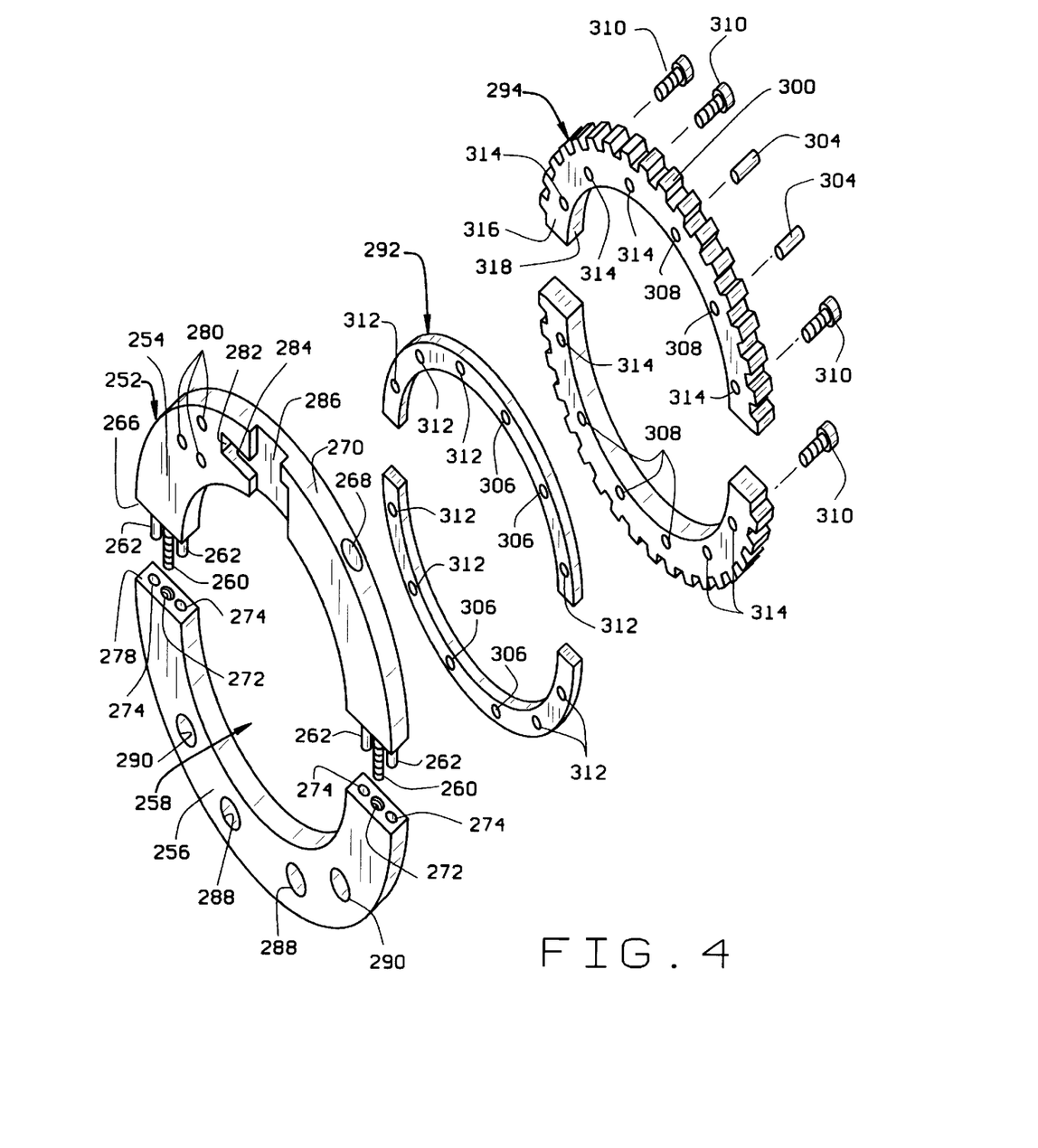
FIG. 4 is a perspective view of the rotating faceplate subassembly forming part of the welding assembly shown in FIG. 1.

FIG. 4 is a perspective exploded view of certain components of rotating faceplate subassembly 112 shown in FIG. 1. Faceplate subassembly 112 includes a faceplate ring 252 having upper and lower split rings 254 and 256 which, when engaged, define an inner, circular shaped opening 258. Ring 254 includes threaded bolts 260 and alignment dowel pins 262 extending from respective ends 264 and 266. Tool openings 268 extend from outer surface 270 of ring 254 to bolts 260. Ring 256 includes bolt openings 272 and dowel pin openings 274 at respective ends 276 and 278. Split rings 254 and 256 are securely engaged by aligning split rings 254 and 256 so that dowel pins 262 extend into openings 274 and threaded bolts 260 are then tightened into bolt openings 272 using an allen wrench (not shown) which extends through openings 268 into engagement with bolts 260.

Upper ring 254 includes openings 280 and machined surfaces 282, 284 and 286 for interfacing with torch assembly 130 (FIG. 1). Lower ring 256 includes wire spool holder openings 288 and wire feeder openings 290 for engaging wire spool holders 126 and feeders 128 (FIG. 1) to lower ring 256.

Faceplate subassembly 112 also includes a two-piece bevel ring assembly 292 and a two-piece spur gear assembly 294 mounted to faceplate ring 252. More specifically, bevel ring assembly 292 includes upper and lower bevel rings 296 and 298 and spur gear assembly 294 includes upper and lower gear rings 300 and 302. Pins 304 extend through aligned openings 306 and 308 in assemblies 292 and 294 to facilitate maintaining bevel rings 296 and 298 and spur gear rings 300 and 302 in alignment. Threaded bolts 310 are inserted through aligned openings 312 and 314 in assemblies 292 and 294 and into engagement with split rings 254 and 256 to maintain bevel rings and spur gear rings 300 and 302 in engagement. Bevel rings 296 and 298 seat on an inner flange 316 formed in an inner surface 318 of spur gear rings 300 and 302.

Bevel rings 296 and 298 rotatably interface with bevel rollers 186 of mounting ring subassembly 110 (FIG. 2) and spur gear rings 300 and 302 mesh with rotatable spur gears 120 and 122 of mounting ring subassembly motors 116 and 118 (FIG. 2) as described hereinafter in more detail. Bevel ring assembly 292 and spur gear assembly 294 each have a generally circular shape and the diameter of spur gear assembly 294 is greater than the diameter of bevel ring assembly 292.

Components secured to faceplate ring 252 can be used with varying size faceplate rings 252. For example, for a larger diameter pipe to be welded, a faceplate ring 252 having a larger diameter may be required, and components from a smaller diameter faceplate ring 252 can be used in connection with the larger diameter faceplate ring 252. Therefore, many different welds having significantly varying diameters can be performed simply by using varying diameter faceplate rings 252 with the same components.

Figure 5:
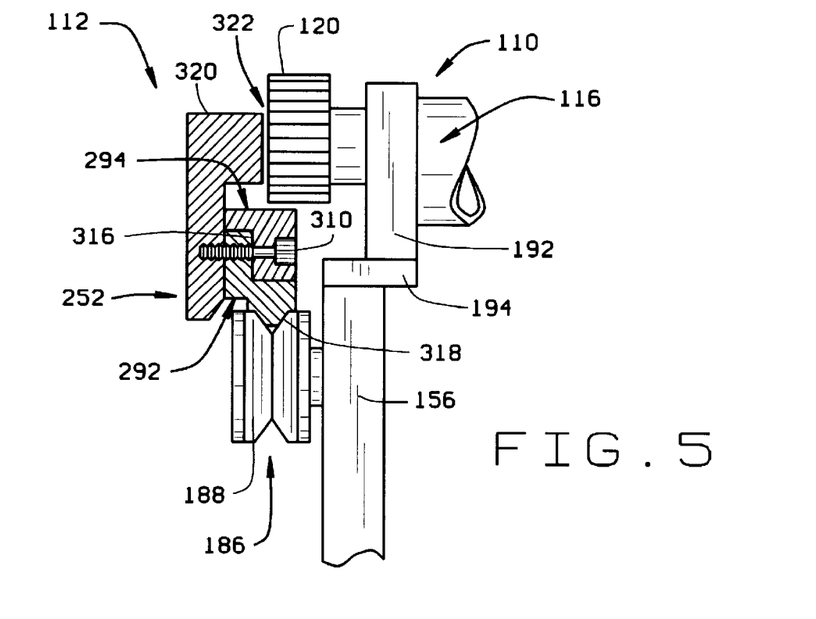
FIG. 5 is a side view of the interface between the drive motor and bevel roller of the mounting ring subassembly and the rotating faceplate, spur gear and bevel roller of the rotating faceplate subassembly shown in FIG. 4.

FIG. 5 is a side view of the interface between spur gear 120 and bevel roller 188 of mounting ring subassembly 10 and spur gear ring assembly 294 and bevel ring assembly 292 of rotating faceplate subassembly 112. As shown in FIG. 5, bevel ring assembly 292 seats within flange 316 formed by spur gear assembly 294. Spur gear assembly 294 meshes with spur gear 120 of drive motor 116. Bevel ring assembly 292 includes a surface 318 configured to mate with bevel rollers 186. A flange 320 of faceplate ring 252 forms a clearance space 322 with spur gear 120. In operation, as spur gear 120 rotates, faceplate ring 252 rotates and bevel ring assembly 292 cooperates with bevel rollers 186 to maintain faceplate subassembly 112 in alignment with mounting ring subassembly 110.

Figure 6:
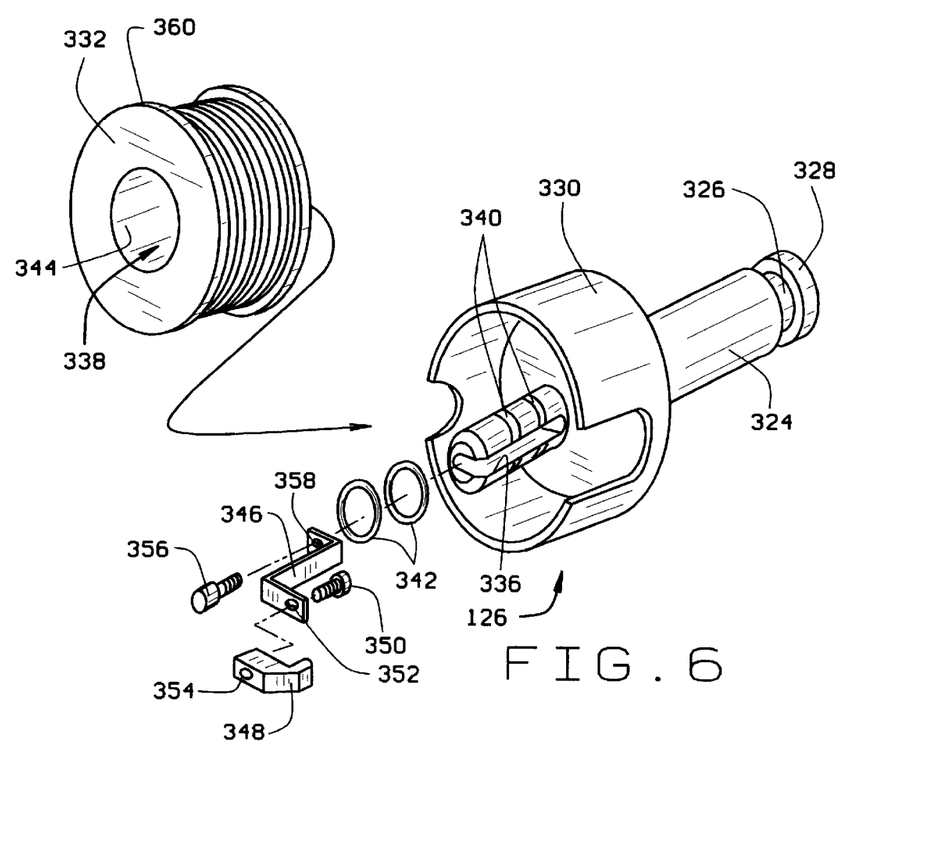
FIG. 6 is an exploded perspective view of the wire spool housing shown in FIG. 1.

FIG. 6 is an exploded perspective view of wire spool holder 126 shown in FIG. 1. Holder 126 is configured for limited clearance applications and includes a shaft 324 having an annular groove 326 formed at one end 328. Groove 326 mates with a set screw in lower faceplate ring 256 (FIG. 4) so that holder 126 is maintained in engagement with lower faceplate ring 256. A cup shaped receptacle 330 is sized to receive at least a portion of a wire spool 332. A u-shaped boss 334 having an slot 336 extending therethrough is located in receptacle 330 and is sized to be inserted at least partially through opening 338 in spool 332. Annular o-ring grooves 340 are formed in boss 334 and are configured to have o-rings 342 positioned therein. O-rings 342 form a friction fit with an inner 344 surface of spool 332 defining opening 338.

A spring clip 346 and spring clip knob 348 are provided to maintain wire spool 332 in receptacle 330. More specifically, spring clip knob 348 is secured to spring clip 346 by a threaded bolt 350 that extends through aligned openings 352 and 354. Spring clip 346 is then secured within slot 336 of boss 334 by inserting bolt 356 through opening 358 of clip 346 and an opening (not shown) in receptacle 330. Wire spool 332 is then slid over boss 334 and when seated, spring clip knob 348 is secured against an outer radial surface 360 of wire spool 332 so that wire 332 spool is rotatable relative to knob 348 but maintained in receptacle 330.

Figure 7:
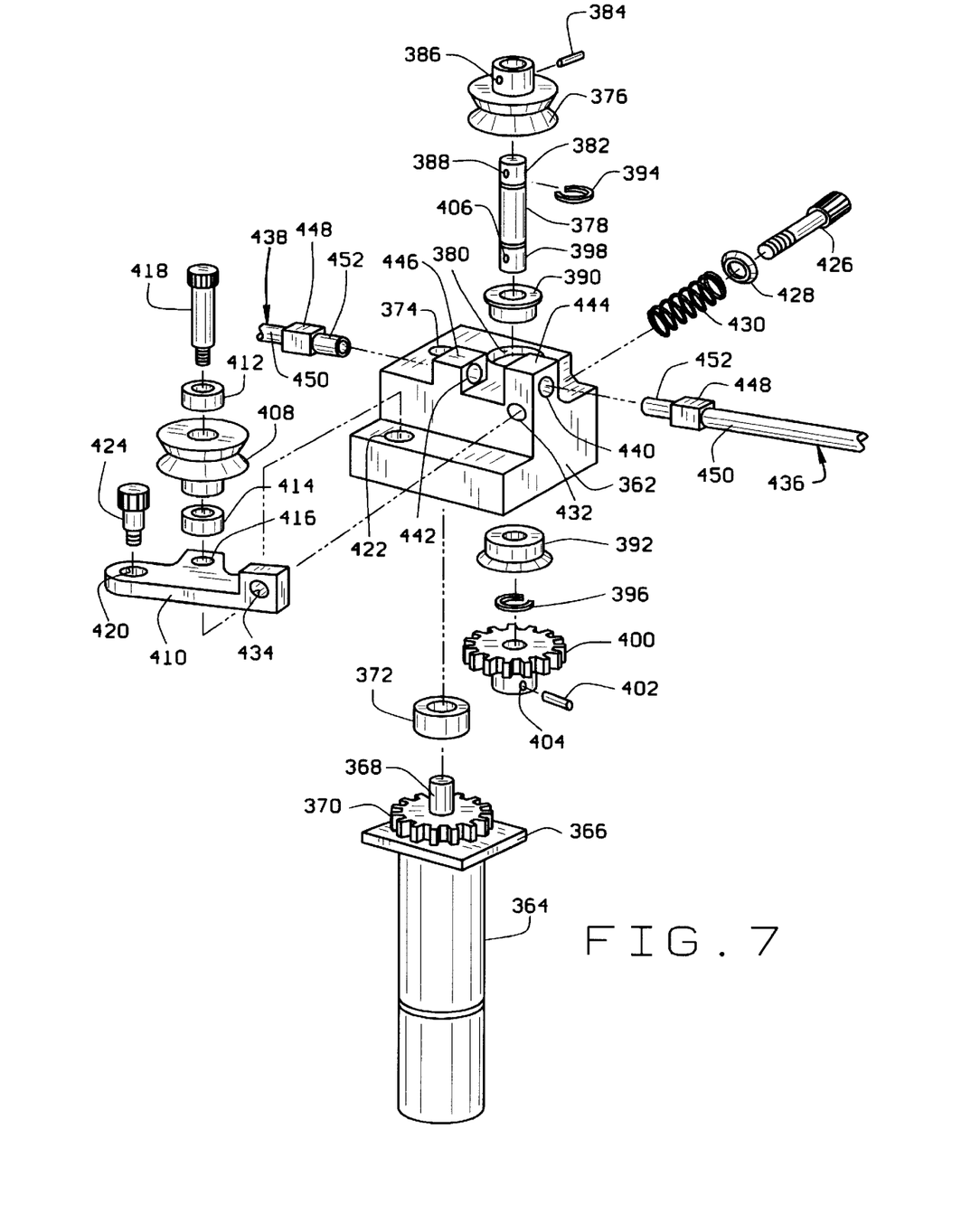
FIG. 7 is an exploded perspective view of the wire feeder shown in FIG. 1.

FIG. 7 is an exploded perspective view of wire feeder 128 shown in FIG. 1. Wire feeder 128 includes a wire feeder housing 362 having a wire feeder motor 364 secured thereto. Particularly, wire feeder motor 364 includes a mounting flange 366 and a rotatable output shaft 368. A spur gear 370 is secured to output shaft 368 and rotates with shaft 368. Motor 364 is secured to housing 362 by inserted bolts (not shown) through aligned openings (not shown) in motor flange 366 and housing 362. A bearing 372 enables rotation of shaft 368 within an opening 374 in housing 362.

A first wire feed gear 376 is mounted to an idler shaft 378 which extends through a bore 380 in housing 362. Specifically gear 376 is secured to a first end 382 of idler shaft 378 by extending a pin 384 through aligned openings 386 and 388 in gear 376 and shaft 378, respectively. First and second flanged bearings 390 and 392 are positioned on opposing ends of housing bore 380. Idler shaft 378 extends through first and second flanged bearings 390 and 392. Retaining rings 394 and 396 engage shaft 378 adjacent bearings 390 and 392 to facilitate maintaining shaft 378 in place. A second end 398 of shaft 378 is engaged to an insulated gear 400 by extending a pin 402 through aligned openings 404 and 406 in gear 400 and shaft 378, respectively. Insulated gear 400 meshes with spur gear 370 of motor 364.

A second wire feed gear 408 is mounted to a tension plate 410. Specifically, wire feed gear 408 is aligned with bearings 412 and 414 and an opening 416 in tension plate 410, and a shoulder screw 418 extends through the aligned openings in bearings 412 and 414 and opening 416 and into engagement with tension plate 410. Tension plate 410 is then secured to housing 362 by aligning tension plate opening 420 with housing opening 422, and then shoulder screw 424 is inserted through aligned openings 422 and 424 into engagement with housing 362. Tension plate 410 is rotatable relative to shoulder screw 424.

The position of wire feed gear 408 relative to wire feed gear 376 is adjustable by a tension screw 426. Specifically, tension screw 426 extends through a washer 428 and a spring 430 and through an opening 432 in housing. Tension screw 426 also extends into an opening 434 in, and into threaded engagement with, tension plate 410.

First and second wire liners 436 and 438 extend through respective openings 440 and 442 in legs 444 and 446 of housing 362. Each liners 436 and 438 includes block portion 448, shaft portion 450, and wire engagement portion 452. Liners 436 and 438 facilitate maintaining wire 144 from spool 126 (FIG. 1) in alignment with wire feed gears 376 and 408.

In operation, spur gear 370 of motor 364 meshes with and rotates insulated gear 400. As insulated gear 400 rotates, wire feed gear 376 rotates. Rotation of wire feed gear 376 draws wire 144 from spool 126 (FIG. 1) and such wire 144 is fed to wire feeder 142 (FIG. 1). Tightening and loosening wire feed gear 408 with respect to wire feed gear 376 controls the tension at which wire 144 is drawn from spool 126. The rate at which wire 144 is fed is controlled by the revolutions per minute (r.p.m.) of spur gear 370.

Figure 8:
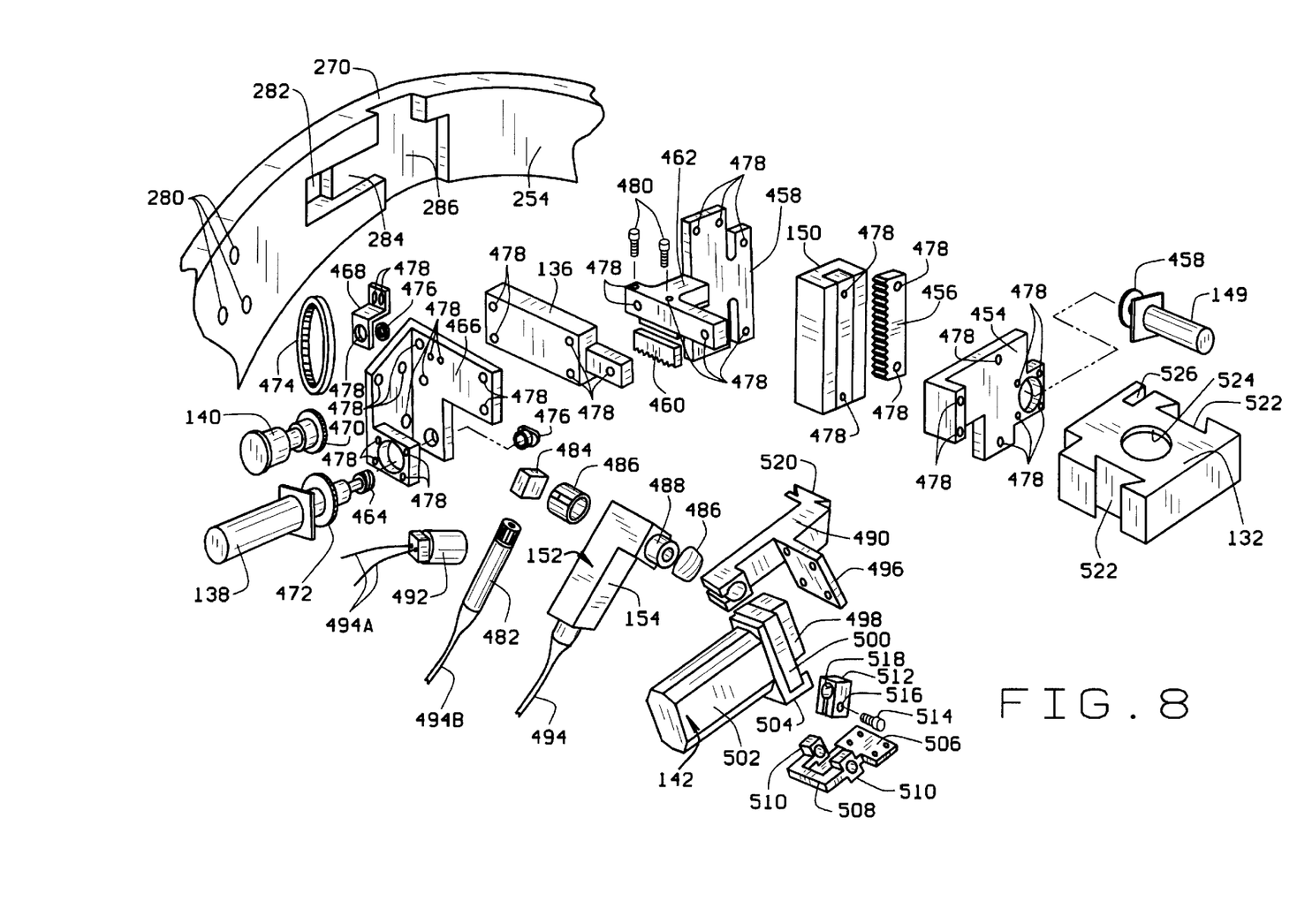
FIG. 8 is an exploded perspective view of the torch assembly mounted to the rotating face plate subassembly shown in FIG. 1.

FIG. 8 is an exploded perspective view of torch assembly 130 mounted to upper split ring 254 of rotating face plate subassembly 112 shown in FIG. 1. Torch assembly 130 includes torch block 132 secured to a torch mounting plate 454 which, in turn, is mounted to slide 150. Slide 150 includes a gear rack 456 that meshes with a spur gear of AVC motor 149. AVC motor 149 is mounted to torch mounting plate 454. Slide 150 is mounted to a mounting bracket 458. An oscillator gear rack 460 is secured to mounting bracket 462. Oscillator slide 136 is secured to oscillator mounting bracket 462. An oscillator motor 138 including a pinion gear 464 is mounted to a bracket 466 and pinion gear 464 meshes with oscillator gear rack 460. Oscillator feedback potentiometer 140 also is secured to a bracket 468 which, in turn, is secured to oscillator mounting bracket 466 to provide position information regarding the position of slide 150. More specifically, timing gear 470 of potentiometer 140 and timing gear 472 of motor 138 are coupled by a timing belt 474 which extends around gears 470 and 472. Oscillator motor 138 controls the forward and backward positioning of torch body 132.

Various washers and couplings 476 are shown in FIG. 3 and such washers and couplings 476 are used in connection with making the above described connections. Also, numerous openings 478 and bolts 480 are used in making such connections. Of course, it is contemplated that the above described mounting brackets, motor and other components could have many different configurations.

With respect to camera unit 152, including housing 154 and camera 482, camera 482 is secured within housing 154, and prism housing 484 and 486 also are mounted in housing 154 to reflect signals to camera 482. A filter lens 486 is secured over camera housing opening 488. Camera housing 154 is secured to a mounting bracket 490. Light assembly 492 also is secured to bracket 490. Power cords 494A and 494B extend from light assembly 492 and camera 482 and, in operation, are coupled to an external power source.

Wire aiming assembly 142 also is secured to bracket 490 at flange 496. Specifically, a slide 498 interfaces with a gear rack 500 secured to housing 502. Gear rack 500 also interfaces with a side-to-side gear rack 504. Wire nozzle slide plate 506, including u-shaped member 508 having wire feed blocks 510, is secured to rack 504. Wire nozzle insulator 512 is secured to housing 502 by a bolt 514 which extends through opening 516. Wire is fed through opening 518.

Bracket 490 includes a mating portion 520 which mates with opening 522 in torch block 132. A bracket, including a camera unit and wire aiming assembly identical to bracket 490, unit 152 and assembly 142, is secured to block 132 on a side of block 132 opposite bracket 490. Torch block 132 also includes an opening 524 for receiving a torch head (not shown) and fitting 526 for receiving gas and water.

Figure 9:
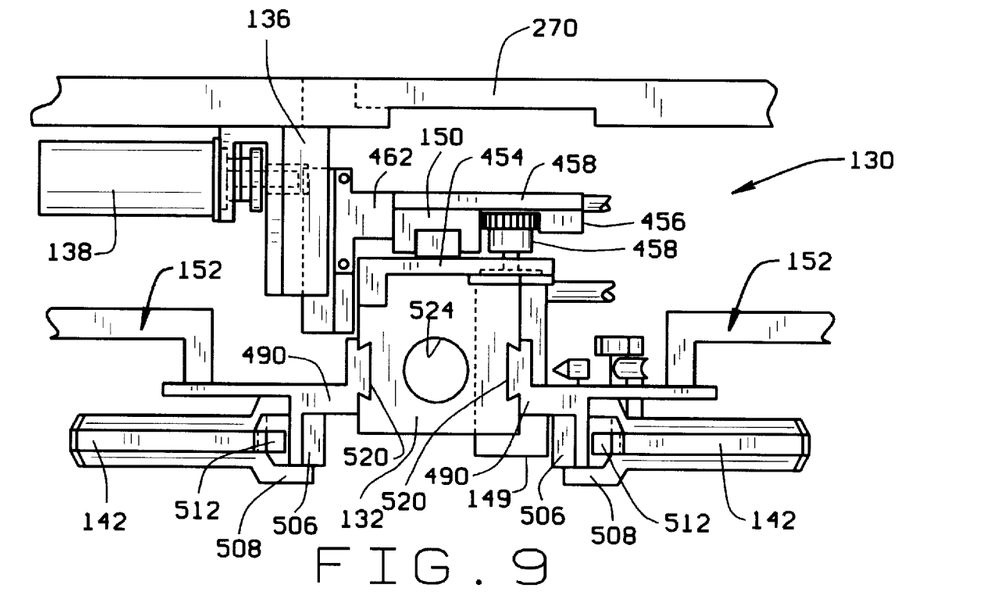
FIG. 9 is a top view of the assembled torch assembly shown in FIG. 8.

FIG. 9 is a top view of torch assembly 130. Two camera units 152, wire aiming assemblies 142, and brackets 490 are shown in FIG. 9 in connection with torch block 132, as described above.

Figure 10:
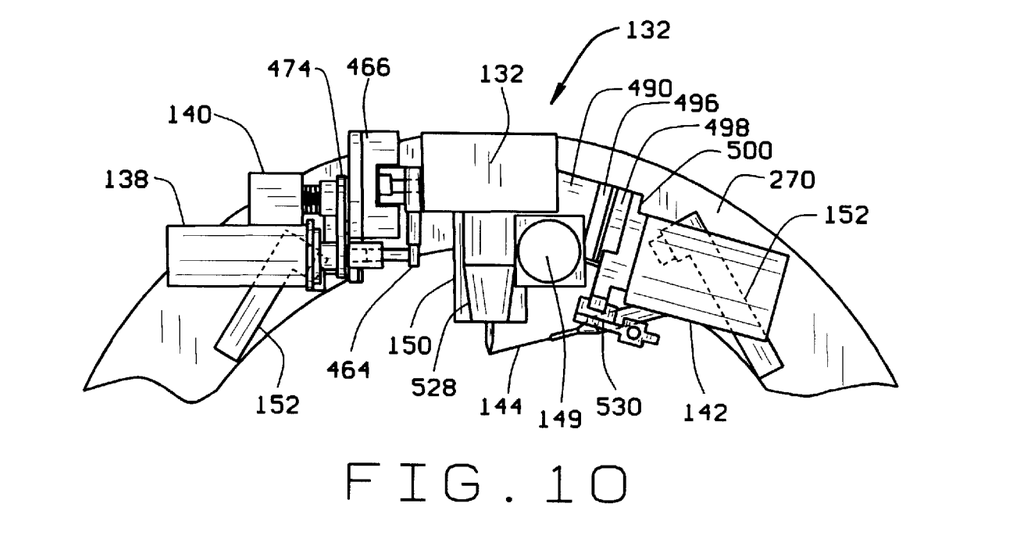
FIG. 10 is a front view of the assembled torch assembly shown in FIG. 8.

FIG. 10 is a front view, with components cut-away, of torch assembly 130. A torch cup 528 is shown extending from block 132. Welding wire 144 is being fed from a wire nozzle 530 connected to wire aiming assembly 142.

In operation, and prior to making a weld, mounting ring subassembly 110 is mounted to a pipe adjacent a location to be welded. Faceplate subassembly 112 is then rotatable secured to mounting ring subassembly 110 and drive motor 116 and slave motor 118 are secured to mounting ring 114 so that mounting ring drive motor spur gear 120 meshes with faceplate spur gear 294. Welding torch assembly 130 is then operated as mounting ring drive motor 116 causes faceplate subassembly 112, including welding torch assembly 130, to rotate relative to the pipe.

The above described automated weld head assembly is particularly suitable for use in nuclear reactor applications having minimal axial and radial clearances and is easy to install and controllable for forming high quality welds. The assembly also can be securely mounted in very restricted envelopes and is easily adaptable for many different set-up circumstances.

From the preceding description of the present invention, it is evident that the objects of the invention are attained. Although the invention has been described and illustrated in detail, it is to be clearly understood that the same is intended by way of illustration and example only and is not be taken by way of limitation. For example, the mounting ring subassembly does not necessarily have to be secured to a pipe to be welded. The mounting ring subassembly, for example, could be secured adjacent a piece to be welded by using brackets. Accordingly, the spirit and scope of the invention are to be limited only by the terms of the appended claims.

What is claimed is:

1. A weld head assembly for forming a weld between two pipes in a nuclear reactor, the pipes having a substantially circular cross sectional shape, said weld head assembly comprising:

a mounting ring subassembly comprising a mounting ring configured to be mounted to one of the pipes, at least one motor mounted to said mounting ring, said motor comprising an output shaft having a rotatable spur gear mounted thereto, and a plurality of bevel rollers mounted at spaced locations to said mounting ring, said rollers mounted along a same radial path; and a faceplate subassembly secured to said mounting ring subassembly, said faceplate subassembly comprising a faceplate ring, a bevel ring assembly engaged to said faceplate ring and located to rotatably interface with said bevel rollers of said mounting ring subassembly, and a spur gear assembly engaged to said faceplate ring and located to mesh with said rotatable spur gear of said mounting ring subassembly motor so that said faceplate subassembly rotates with said motor spur gear, said bevel ring assembly comprising upper and lower bevel rings and said spur gear assembly comprising upper and lower gear rings, said spur gear assembly further comprising an inner flange and said bevel ring assembly being seated on said inner flange, said bevel ring assembly and said spur gear assembly each having a generally circular shape, the diameter of said spur gear assembly being larger than the diameter of said bevel ring assembly.

2. A weld head assembly in accordance with claim 1 wherein said mounting ring of said mounting ring subassembly comprises at least a first split ring and a second split ring, said first and second split rings threadedly engageable.

3. A weld head assembly in accordance with claim 1 wherein said mounting ring of said mounting ring subassembly comprises a plurality of alignment screws extending from an inner radial surface of said ring.

4. A weld head assembly in accordance with claim 1 wherein at least two motors are mounted to said mounting ring, at least one of said motors being a drive motor and at least one of said motors being a slave motor.

5. A weld head assembly in accordance with claim 1 wherein at least four bevel rollers are mounted at spaced locations on said mounting ring.

6. A weld head assembly in accordance with claim 1 wherein said faceplate subassembly further comprises at least one wire spool holder mounted to said faceplate ring.

7. A weld head assembly in accordance with claim 1 wherein said faceplate subassembly further comprises at least one wire feeder mounted to said faceplate ring.

8. A weld head assembly in accordance with claim 1 wherein said faceplate subassembly further comprises a welding torch secured to said faceplate ring.

9. A weld assembly in accordance with claim 8 wherein said faceplate subassembly further comprises an oscillator motor secured to said faceplate ring and coupled to said welding torch, and at least one camera secured to said faceplate ring for viewing the location of a weld during a welding operation.

10. A weld head assembly, comprising:

a mounting member subassembly comprising a mounting member configured to be mounted substantially adjacent a location at which a weld is to be formed, at least one motor mounted to said mounting member, said motor comprising an output shaft having a rotatable spur gear mounted thereto, and a plurality of bevel rollers mounted at spaced locations to said mounting member; and a faceplate subassembly secured to said mounting member subassembly, said faceplate subassembly comprising a faceplate, a bevel assembly and a spur gear assembly mounted to said faceplate, said bevel assembly located to movably interface with said bevel rollers of said mounting member subassembly and said spur gear assembly located to mesh with said rotatable spur gear of said mounting member subassembly motor so that said faceplate subassembly rotates with said motor spur gear, said bevel ring assembly comprising upper and lower bevel rings and said spur gear assembly comprising upper and lower gear rings, said spur gear assembly further comprising an inner flange and said bevel ring assembly being seated on said inner flange, said bevel ring assembly and said spur gear assembly each having a generally circular shape, the diameter of said spur gear assembly being larger than the diameter of said bevel ring assembly.

11. A weld head assembly in accordance with claim 10 wherein said mounting member of said mounting member subassembly comprises at least a first split ring and a second split ring, said first and second split rings threadedly engageable.

12. A weld head assembly in accordance with claim 10 wherein said mounting member of said mounting member subassembly comprises a substantially elongate member.

13. A weld head assembly in accordance with claim 10 (wherein said mounting member of said mounting member subassembly further comprises a plurality of alignment screws extending from an inner surface of said mounting member.

14. A weld head assembly in accordance with claim 10 wherein at least two motors are mounted to said mounting member, at least one of said motors being a drive motor and at least one of said motors being a slave motor.

15. A weld head assembly in accordance with claim 10 wherein at least four bevel rollers are mounted at spaced locations on said mounting member.

16. A weld head assembly in accordance with claim 10 wherein said faceplate subassembly further comprises at least one wire spool holder mounted to said faceplate and at least one wire feeder mounted to said faceplate.

17. A weld head assembly in accordance with claim 10 wherein said faceplate subassembly further comprises a welding torch secured to said faceplate.

18. A weld head assembly in accordance with claim 17 wherein said faceplate subassembly further comprises an oscillator motor secured to said faceplate and coupled to said welding torch, and at least one camera secured to said faceplate for viewing the location of a weld during a welding operation.

* * * * *